United States Patent [19]
Stimler et al.

[11] 3,903,497
[45] Sept. 2, 1975

[54] OPTO-ACOUSTIC HYDROPHONE

[75] Inventors: Morton Stimler, Rockville; Zaka I. Slawsky, Bethesda, both of Md.

[73] Assignee: The United States of America as represented by the Secretary of the Navy, Washington, D.C.

[22] Filed: June 14, 1974

[21] Appl. No.: 480,186

[52] U.S. Cl............... 340/2; 178/DIG. 2; 340/13 R; 350/96 B
[51] Int. Cl.² H04R 1/44; H04R 17/00; H04R 23/02
[58] Field of Search ....... 340/3 C, 5 MP, 8 R, 13 R, 340/2, 10; 178/DIG. 2; 350/96 B

[56] References Cited
UNITED STATES PATENTS
| | | | |
|---|---|---|---|
| 3,206,719 | 9/1965 | Pure | 340/2 |
| 3,543,229 | 11/1970 | Baum | 340/3 R |
| 3,701,990 | 10/1972 | Tuttle | 340/6 R |
| 3,780,572 | 12/1973 | Rocha | 340/5 MP |
| 3,784,805 | 1/1974 | Rolle | 340/3 R |
| 3,809,908 | 5/1974 | Clanton | 250/217 S |
| 3,831,137 | 8/1974 | Cuomo | 340/8 R |

*Primary Examiner*—Richard A. Farley
*Attorney, Agent, or Firm*—R. S. Sciascia; J. A. Cooke; Sol Sheinbein

[57] ABSTRACT

An opto-acoustic hydrophone converting acoustic signals to corresponding modulated optical signals and transmitting the converted signals via a fiber optics cable to a remote location. The acoustic signal is first converted to an electrical signal prior to converting it to an optical type.

2 Claims, 1 Drawing Figure

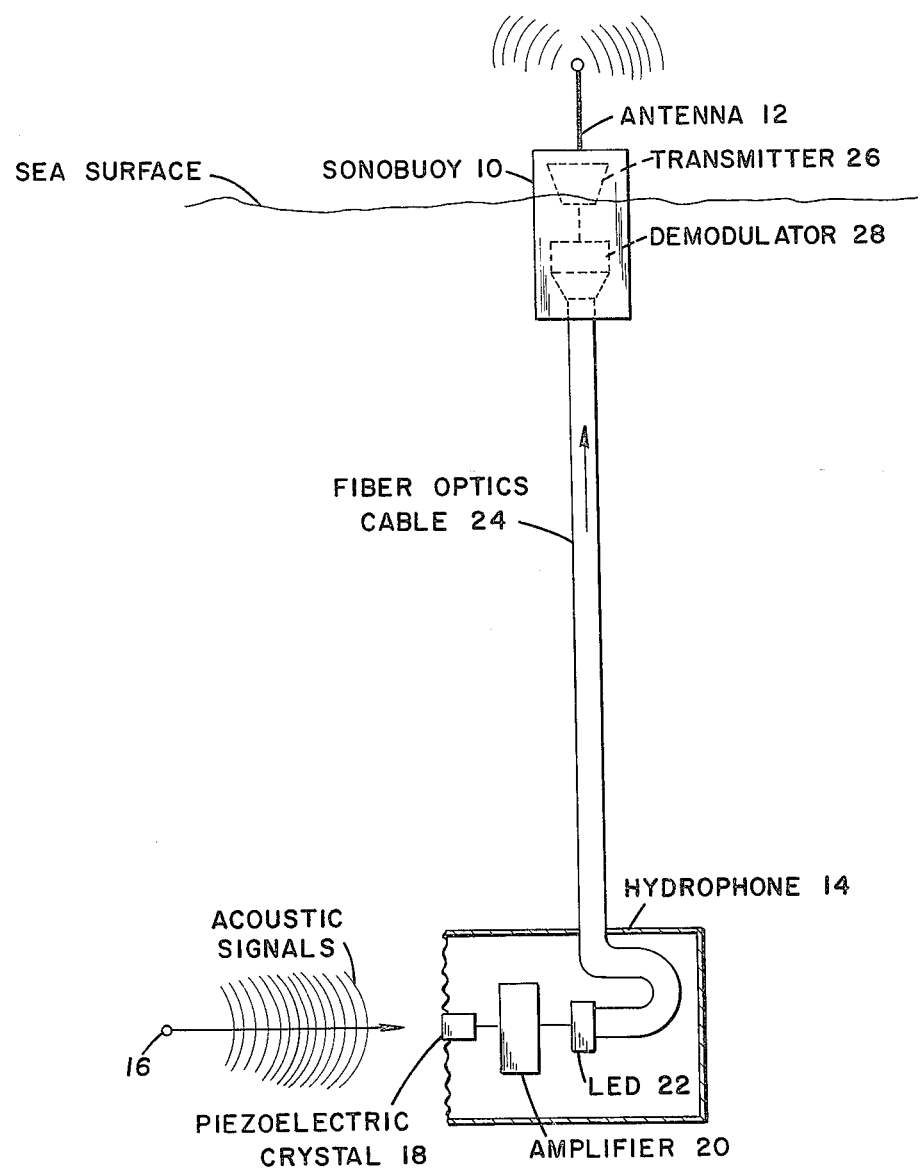
FIGURE

OPTO-ACOUSTIC HYDROPHONE

BACKGROUND OF THE DISCLOSURE

The present invention relates to hydrophones, and more specifically to opto-acoustic hydrophones.

In current acoustic hydrophone systems, electrical cables are used to transmit information (converted acoustic signals to modulated electrical signal) from a submerged acoustic hydrophone to a remote location. The employment of electrical cables has been found to be bulky and heavy as well as deficient due to electrical leakage. Additional problems encountered when using electrical cables in hydrophones have been: Crosstalk between elements in a cable, radiation, common ground requirements between source and receiver, short circuits due to moisture in the transmission cable, reflection and ringing, danger from electrical sparks in areas where volatile fumes exist, copper shortage and low resistance to fires. Due to the aforementioned problems, a substitute for electrical cables in hydrophones has been desired.

Prior to 1970, optical fibers for use in transmission of optical signal information were not practical over distances greater than 100 feet. This was due primarily to optical losses introduced by absorption and scattering which resulted in attenuation on the order of 1,000 dB/km in the commercially available fibers at the time. Since then, fibers over 100 meters long with attenuations of 200 dB/km have become available, enabling transmission over several kilometers without the need for repeaters. More recently, attenuations of less than 2dB/km for fiber lengths exceeding one-half km have been achieved.

SUMMARY OF THE INVENTION

Accordingly, there is provided an opto-acoustic hydrophone converting received acoustic signals to corresponding optical signals. The acoustic signal received at the hydrophone is first converted to an electrical signal by a piezoelectric crystal and then to a modulated optical signal by a light emitting diode (LED). The modulated signal is transmitted by fiber optics cable to a demodulator on the ocean surface whereupon the electrical signal is transmitted by an antenna.

It is therefore an object of the present invention to provide an opto-acoustic hydrophone.

Another object of the present invention is to provide fiber optics cables to transmit acoustically derived information from a hydrophone to a remote location such as sonobuoy.

Yet another object of the present invention is to provide an opto-acoustic hydrophone for converting acoustic signals to correspondingly modulated optical signals.

Still another object of the present invention is to provide a light and compact hydrophone system not subject to radiation, moisture or electrical problems.

Other objects, advantages and features of the present invention will be better understood from the following description of one particular non-limitative application in the form of preferred but non-exclusive embodiments considered in conjunction with the accompanying drawing wherein:

The FIGURE is a schematic drawing illustrating a opto-acoustic hydrophone embodiment according to teachings of this invention.

DESCRIPTION OF THE PREFERRED EMBODIMENTS

Referring now to the Figure, there is shown a sonobuoy 10, at the sea surface for transmitting signals via antenna 12 supplied by opto-acoustic hydrophone 14 upon its receiving acoustic signals 16. The acoustic signals 16 are converted to electrical signals by piezoelectric crystal 18 whose output impedance is matched to the input impedance of a battery operated power amplifier 20. The amplifier 20 gain and output impedance are chosen to satisfy the power requirements of light emitting diode (LED) 22. The LED 22 is chosen to have sufficiently fast response time so that its modulated optical output will be an accurate reproduction of the acoustic signal 16. The modulated optical signal is then optically coupled to and transmitted through the fiber optics cable 24 to the sonobuoy 10 where the optical signal is reconverted to an electrical signal by demodulator 28, which may comprise a photoelectric detector unit, for transmission by transmitter 26 coupled thereto. As is evident, optical couplers are situated after LED 22 and before demodulator 28 but are not shown for clarity.

LED 22 is chosen to have an output wavelength corresponding to the minimum attenuation of the fiber optics cable 24 to which it is optically coupled. Commercially available GaAs LED's are capable of delivering 50 mW of optical power in the 9,000 A range, the range of minimum attenuation in presently available fiber optics cables.

It is therefore seen from the above description of a preferred embodiment of the invention that there has been provided an opto-acoustic hydrophone allowing the use of fiber optics in place of electrical cables. This reduces the size, weight and solves the problems such as, leakage, radiation, moisture, etc. currently encountered in sonobuoys employing electrical cables.

While the principles of the invention have now been made clear in an illustrative embodiment, obvious modifications particularly adapted for specific applications, environments and operating requirements may be made without departing from the principles. It is therefore not desired to limit the invention to the exact details shown except insofar as they may be defined in the following claims.

What is claimed as new and desired to be secured by Letters Patent of the United States is:

1. An opto-acoustic hydrophone-sonobuoy system comprising:

a piezoelectric crystal in said hydrophone for converting received acoustic signals to electrical signals;

a light emitting diode in said hydrophone for converting said electrical signals to optical signals;

a matched amplifier coupled between said piezoelectric crystal and said light emitting diode;

a fiber optics cable for transmitting said optical signal to said sonobuoy; and a demodulator in said sonobuoy for converting said optical signal to an electrical signal.

2. An opto-acoustic hydrophone-sonobuoy system as recited in claim 1 wherein the optical output of said diode (10) reproduces the received acoustic signal, said diode is a GaAs diode operating at 9,000 A wavelength.

* * * * *